United States Patent
Taintor

[11] 4,034,625
[45] July 12, 1977

[54] MANUALLY CONTROLLED SEMI-AUTOMATIC STEP GEAR TRANSMISSION

[76] Inventor: Oliver E. Taintor, 7 Lynack Road, Hawthorne, N.J. 07506

[21] Appl. No.: 642,812

[22] Filed: Dec. 24, 1975

[51] Int. Cl.² .......................................... F16H 3/58
[52] U.S. Cl. ................................ 74/769; 74/752 C
[58] Field of Search ............... 74/752 C, 753, 768, 74/861, 865, 867, 769

[56] References Cited

U.S. PATENT DOCUMENTS

| | | | |
|---|---|---|---|
| 1,660,997 | 2/1928 | Kearby | 74/769 |
| 2,620,685 | 12/1952 | Smirl | 74/752 C |
| 2,756,600 | 7/1956 | Kamlukin et al. | 74/769 X |
| 2,871,726 | 2/1959 | Kamlukin | 74/769 |
| 3,160,030 | 12/1964 | Wickman | 74/769 X |
| 3,971,268 | 7/1976 | Murakami et al. | 74/753 X |

*Primary Examiner*—James F. Coan
*Attorney, Agent or Firm*—James J. Cannon, Jr., James J. Cannon

[57] ABSTRACT

A manually controlled semi-automatic, multiple-step, internal gear driven transmission characterized by a hydraulic activation system of compensating fluid pressure versus spring compression resistance forces including a forward section having an integrated dual clutch and pinion carrier, driven by an engine shaft, a gear-type oil pump driven by helical gears supplying the servo-system, a rear section pinion carrier, related die cast pinion gear clusters, annulus gears and an interconnecting middle section dual-annulus gear. The gear ratio changes are effected by annulus fluid-combination spring power cylinder brake control and fluid actuated clutches capable of causing the transmission of torque to a load shaft directly through a main shaft, through the rear pinion carrier or through the dual annulus, whereby the least reduction is obtained when all elements are in operation. The invention is further characterized by a variable pressure regulator, governing actuating fluid pressure at idling speeds, and a differential-piston pressure regulator, governing main line fluid pressure at all speeds, to a directory rotary distributor valve feeding said power cylinders and clutches as directed by a manual straight line shifting arrangement, said regulators having a compensating fluid pressure versus spring compression design.

6 Claims, 14 Drawing Figures

MANUALLY CONTROLLED SEMI-AUTOMATIC STEP GEAR TRANSMISSION

BACKGROUND OF THE INVENTION

The present invention relates to power transmissions and in particular to those which are semi-automatic in nature and have epicyclic planetary gear trains in combination with hydraulically activated power cylinder and clutch gearing controls as directed through a rotary distribution valve by means of straight line shifting control. The invention relates to combinations of achieving smooth gearing transitions through regulation, at idling speeds and at operating speeds, through a system of compensating fluid pressure versus spring compression resistance valves sensitive to main line pressure respectively. The invention further relates to an exclusive interconnected internal gear drive arrangement, of engine torque transference to a load shaft, through plural power paths, which employs a majority of die cast pinion gears.

DESCRIPTION OF THE PRIOR ART

The present invention relates to semi-automatic multiple step-ratio transmissions and particularly to one which is controlled manually through a straight line shifting arrangement but without the necessity of having to utilize a foot clutch pedal. A unique system of two sets of epicyclic gears, having internal gear drive, is used negating the need of conventional spur-gear tooth action at any point in the power train. Due to a unique fluid pressure versus spring compression activated hydraulic servo-system, which relieves stress upon the engine and internal elements, lower gear tooth pressures result making feasible the use of die cast gears in this arrangement of exclusive internal gear drive, which would allow a marked reduction in manufacturing costs over the prior art. The epicyclic gearing interacts with and transfers torque from a variable speed prime mover or engine shaft to a variable speed load shaft interconnected with the driving means. In contrast to the prior art, wherein the greatest reduction is obtained when both sets of gears are in operation, in the present invention, the least reduction occurs when both sets of planetary gears are in operation.

The primary purpose of a transmission is to maximize torque for any given engine speed and transmit the same to the elements which directly drive the vehicle as efficiently as possible. Since it has become increasingly necessary to conserve resources, especially energy fuels, it is desired that a transmission be an integral part of achieving economy. To achieve greatest efficiency and reliability one would use a standard manual clutch operated gearbox system as evidenced by the sub-compact cars being manufactured today. The majority of vehicle owners, however, are concerned only with a means of transport and its ease of operation which, in effect spurred the development of fully automatic transmissions. Automatic transmissions yield convenience but generally they are bulky and very complicated in total operation, not readily adaptable to the smaller "compact" vehicles and more expensive; thus the characteristics of the automatic transmission are not compatible with the economy aspects of the smaller cars due to a great divergence of efficiency when compared with a standard transmission.

As a result the present invention has combined advantages of both systems by producing a transmission of minimal size which is economical to build and to operate, is efficient and is not difficult or inconvenient to operate. Maintenance of the transmission is not difficult as compared to other transmissions, and furthermore it employs a gear system, although somewhat altered, that has been proven to be highly reliable. In fact it was noted in *Modern Transmission Systems*, Volume 5, 1962, Arthur W. Judge at page 16, that a transmission of the type herein disclosed would be most desirable if a satisfactorily integrated hydraulic system, pump and motor combination could be found, thus reducing the complexity and prior inefficiency of such systems which have been common to the art. The unique arrangement and composition of the hydraulic servo-system of the present invention reduces the number of individual components necessary to operate the system due to the elimination of a number of components utilized to activate prior art systems such as electrical connections and auxiliary solenoids.

The prior art means of controlling and operating the servo-system of a semi-automatic transmission have been by electrical, pneumatic, or by hydraulic means. These units are placed in operation, as is the present invention, by manual operation of a gear lever or switch. These systems have varying degrees of complexity, but we are concerned primarily with the hydraulic systems.

Prior art means of transmission hydraulic servo-system activation generally include the following: The Bendix vacuum which utilizes a servo-cyclinder and piston; the Gillette clutch control which makes use of a governor in conjunction with accelerator control, combined with a switching means to quickly disengage the clutch for shifting purposes; the Manumatic system which employs an electrical system for activation; and patents earlier cited.

The present system is most similar to those systems known as fluid coupling transmissions wherein a pump is driven by a variable speed prime mover. This system eliminates the loss of power by slip and provides the vehicle with a smooth acceleration from rest. These systems employ a turbine shaft, fluid friction clutch shoes and a flywheel drum as components.

The present invention employs similar components but is differentiated from the prior art and characterized by elements which form a system of compensating fluid pressure versus spring compression activation means. Rather than use a fluid friction clutch or other prior art hydraulic servo-system or transmission activation means, a variable pressure regulator is employed which is supplied control oil from a submerged gear-type pump driven by helical gears which, in turn, receive driving power directly from the engine. The variable pressure regulator, acting upon a principle of compensating fluid pressures and opposing spring compression pressures, at idling speeds, furnishes pressurized lubrication at 5 to 100 percent of main line pressure to a rotary distributor valve which supplies oil under pressure to the appropriate brake cylinder and clutch connections, individually or in combination, thus providing the desired sequence of gear changes. Means to assure maintenance of adequate main line pressure, the annulus gear control means, and clutch separators are also designed on the concept of compensating fluid pressure versus spring compression. Thus the combination allows the engine to pick up the load gradually, without shock, yielding greater efficiency with less stress on interrelated component parts, primarily the engine and the gear trains. Furthermore, this feature greatly aids fuel economy and may be easily maintained due to the simplicity of design and the relatively small number of operative component parts and their ready accessability.

The use of epicyclic gearing is common to the art due to the reliability and simplicity of the system. As previously stated, this specific gearing system and arrangement is operated in combinations not found in the prior art to the best of the inventor's knowledge. This arrangement was designed to optimize efficiency and reduce overall bulk and weight. In contrast to the present invention, many prior art epicyclic gear trains have had problems incorporating reverse gear integrally with the remainder of gearing combinations. Many prior art transmissions even have distinctly separate gearing arrangements for the reverse gear. Reverse, in the present invention, is incorporated in the rear unit of the transmission and is operated through the meshing of the rear planetary gear cluster combination.

The present transmission system, therefore, is an improvement over prior art combinations due to the utilization of a unique hydraulic servo-system in combination with the unique gear train arrangement. Thus the hydraulic servo-system creates low stress on internal gearing components by its gradual activation of the same. There is no conventional spur gear tooth action at any point in the power train, and since the transmission uses internal gear drive exclusively, it is feasible to use die cast gears which would effect a marked reduction in manufacturing costs.

Although maximum acceleration may not be obtained, the transmission is conducive to obtain high gas mileage. The transmission is highly efficient and would be readily adapted to the new lines of cars being produced. Other features and advantages of the present invention will become evident throughout the application.

SUMMARY OF THE INVENTION

The present invention relates to a semi-automatic transmission employing a unique combination of epicyclic gearing which is manually controlled in a straight-line shifting arrangement through the incorporation of an uniquely integrated compensating fluid pressure versus spring compression controlled hydraulic servo-system. The epicyclic gearing in combination with a dual clutch arrangement acts to provide efficient torque application from an engine shaft or variable speed prime mover to a driven load shaft. To further distinguish this gearing system, it should be noted that the least reduction prevails when the majority of gears are engaged, that is, in third gear, being below direct drive, in the four speed transmission of the present invention.

The invention is characterized by several improvements over prior art concepts. The hydraulic servo-system has an helical gear driven submerged gear-type oil pump, which receives driving power from a forward pinion carrier, to provide main line pressure lubrication to all vital parts of the transmission. The rotary distributor valve, directing activation of the power cylinder gearing control means and clutches, is rack and pinion driven and linked to the shift lever. These elements allow a straight line shifting arrangement with the operator easily selecting the appropriate gear, without the aid of a manual clutch, for smooth and efficient activation and operation of the transmission. Thus, through this arrangement, the entire hydraulic servo-system is simplified.

The hydraulic servo-system, being integrated into the forward portion of the transmission, is constructed so that power is transmitted from the main engine shaft through a forward pinion carrier to the two helical drive gears of the transmission oil pump which, in turn, acts to supply control oil to the variable pressure regulator which, in turn, activates the entire transmission hydraulic system. The regulator primarily acts to allow the hydraulic servo-system and gearing combinations to be activated at an idling speed gradually, without shock, on a "creeping" basis. When the engine speed is increased to a "fast idle", regulated oil pressure increases gradually to main line pressure and the transmission is solidly in the gear of the driver's choice. Main line and gearing activation pressure are maintained throughout the entire system by components which are fluid pressure versus spring compression activated thus enabling the transmission to pick up the load gradually, without shock, which obviously reduces strain upon the entire system.

The oil flow throughout the transmission, other than basic lubrication, is controlled manually by the straight line shifting arrangement which has an integrated toothed rack which meshes with a pinion gear to activate the proper connections of the hydraulic servo-system through the operation of a rotary distributor valve. The rotary distributor valve directs pressurized oil flow to the correct fittings, those being the various brake bands and clutches. The valve itself contains four high pressure ports and is connected to and supplied from the variable pressure regulator by a major oil line. Therefore, once the hydraulic system has been activated by the engine shaft or prime mover at an idling speed, and once the operator has manually selected his desired gear causing the rotary distributor valve to connect the proper oil line, the transmission is ready for operation. When the engine shaft rotations are increased to a fast idle, causing the restriction of the oil flow through the variable pressure regulator to cease, which obviously allows full pressurized flow to all components, the unique set of epicyclic gears will be set in motion corresponding to the operations directed manually from the shift lever.

At operating speeds, that is those above idle, when main line pressure is within limits, a by-pass valve recirculates pump output to a sump. To maintain adequate mainline and operating pressure at operating speeds, a fluid pressure versus spring compression differential piston pressure regulator, sensitive to main line pressure, activates the by-pass valve to resupply an accumulator when pressure falls below a specified limit. The accumulator maintains a main line oil supply and thus provides adequate pressure to assure proper pressure through the rotary distributor valve to the gearing components to keep the transmission solidly in gear. Furthermore, the gearing control means, being the brake bands, are also designed to be activated and to operate on a fluid pressure versus spring compression principle to allow gradual activation of the gearing elements.

The actual gearing system is comprised of the aforementioned engine shaft, a rearwardly positioned load shaft and two planetary gearing sections consisting of three pinion sets each. More pinion sets per section may be incorporated and could result in further size and weight reduction, but the basic driving principles would remain the same. The forward section of the transmission further includes a dual-clutch system which yields the capability of transmitting engine torque through either the main shaft of the transmission, the rear planetary gear carrier, or through a dual-annulus gear, locked in step with the rear pinion carrier, to the load shaft. The dual clutch assembly is connected to the hydraulic system and is activated through an annular piston which, in effect, when in operation, causes torque to be transmitted from the drive clutch plates to the driven clutch plates. A unique fluid pressure versus spring compression separator to prevent disc slippage forms an integral part of the annular piston.

The forward pinion set and planetary gear set is further comprised of a brake band, an annulus gear, three pinion gear clusters, each consisting of two gears and a forward section of a dual-annulus gear. Between the rear pinion carrier and the dual-annulus gear, a sprag clutch is positioned, as is common to the art, to prevent the rear pinion carrier from reversing its direction when the dual-annulus gear is in operation. The dual-annulus gear is further mounted upon the hub extension of the rear planetary carrier. The dual annulus may be restrained by the operation of the second brake band.

The rear planetary gear set consists of a third brake band, an annulus gear, and three pinion gear clusters, each comprised of three gears which act to interconnect the rear planet carrier and the load shaft. The dual-annulus gear communicates with and serves as a link between the front and rear planet gear sets.

Briefly, the operation of the transmission gearing system is as follows:

In neutral, the rotary distributor valve is directed to allow no oil pressure to be applied to any elements which would cause the load shaft to rotate. The load shaft, therefore, remains stationary.

In reverse, the rear clutch is activated causing the rear pinion carrier to turn at engine speed. The rear brake band is applied and tightened thereby restraining the annulus gear and giving reactive force to the pinion gear cluster causing the load shaft to turn in the opposite direction of the rear pinion carrier and engine shaft.

In low or first gear, the rear clutch again activates the rear pinion carrier, but now the middle brake band is activated, restraining the dual annulus gear and causing one gear of the rear cluster to drive the load shaft forward, but at a greatly reduced speed as compared to that of the rear pinion carrier.

In second gear, no clutch action occurs. The forward brake band, restraining the forward annulus gear, is tightened causing the smaller of the forward planetary gears to drive the dual annulus forward but at a rate which, compared to that of the engine shaft, is reduced. While the dual annulus gear rotation is being increased in speed, the rear pinion carrier is slowing down and giving up its inertial energy to the load shaft. The sprag clutch thereafter comes into operation by locking the rear pinion carrier and dual-annulus gear into step; thus the entire engaged assembly, including the load shaft, revolves as a unit, the reduction being that of the front pinion gear cluster.

In third gear the same combination of elements occurs as in second gear, plus the activation of the rear clutch, causing the rear pinion carrier to rotate at engine speed. This yields another increment of speed to the load shaft. It should be noted that in third gear the transmission has its least reduction while all gearing elements are in operation.

In fourth gear the forward clutch is activated to provide a direct connection between the engine shaft and the load shaft through the main transmission shaft, yielding direct drive.

The present invention provides a transmission having relatively small size, one having a relatively simple composition and interrelated operation, and one having a minimum of component parts. This results in ease of maintenance and economy in production and manufacture. The transmission is highly efficient and smooth in its operation which will result in savings of fuel and maintenance costs.

These features are a result of the uniquely integrated compensating fluid pressure versus spring compression controlled hydraulic servo-system which makes possible the use of all internal gear driven elements. In fact the transmission pinion gear clusters are characterized by the use of die cast gears. This in itself allows a marked reduction in manufacturing and related maintenance costs. Further features and advantages will be apparent from the accompanying drawings and description.

DESCRIPTION OF THE DRAWINGS

Figure 1:
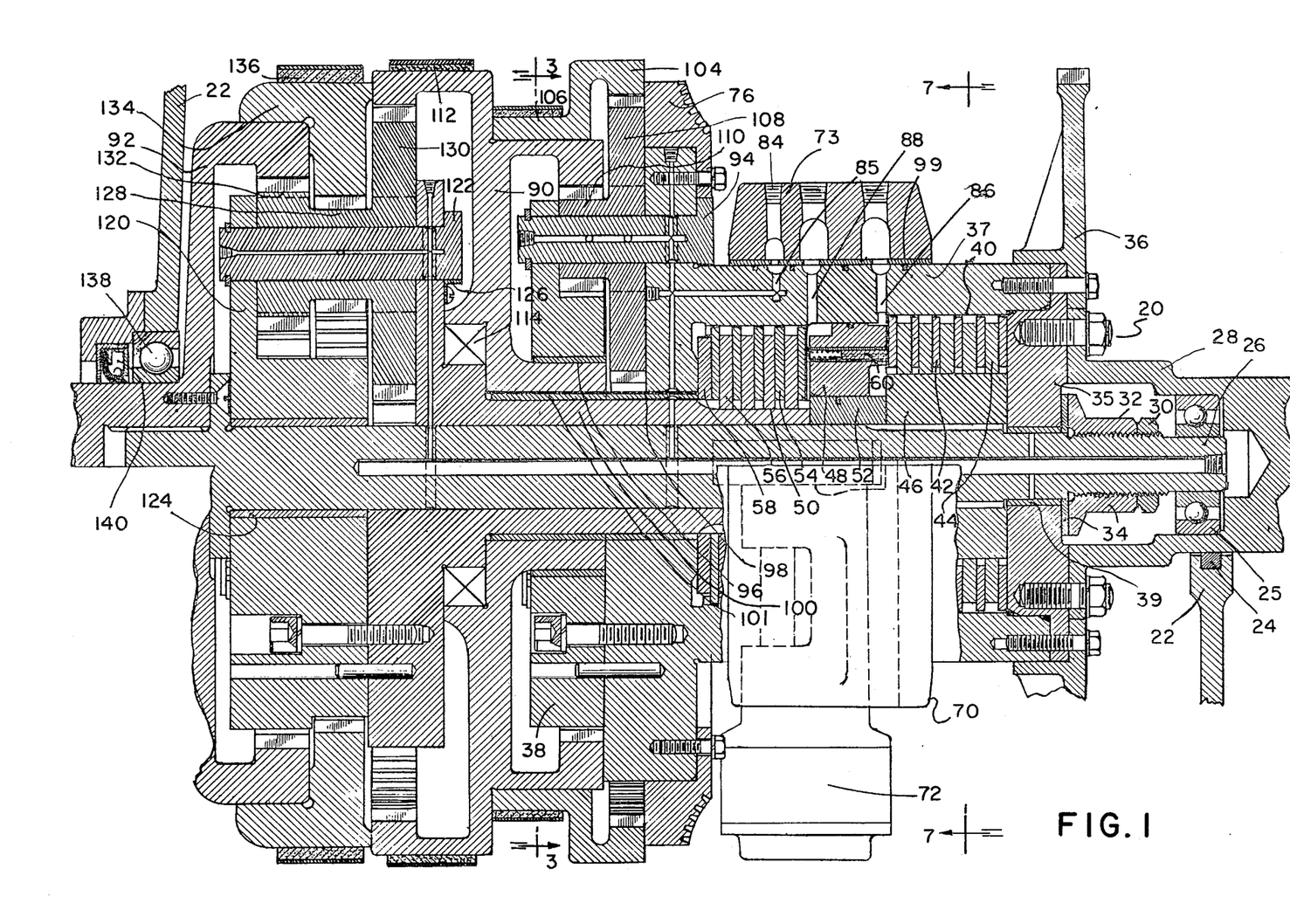
FIG. 1 is an elevation section of the operative mechanical elements of the transmission of the present invention.

Referring now to FIG. 1, an elevation view of the power transmission of the present invention is generally designated by reference numeral 20. Transmission 20 is supported within a casing 22 which is interconnected to the same by seal 24. Bearing 25 forms the front support for main transmission shaft 26. Main shaft 26 is surrounded and movably secured within transmission case 22 by lock nut 30 securing nut 32 which communicates with a spacer 34 which separates the same from clutch housing endplate 35. Starter gear 36 and variable speed prime motor drive shaft 28 circumscribe the aforementioned portion of transmission 20, starter gear 36 being affixed to clutch housing end plate 35 and to forward pinion carrier 38 and prime mover 28 being affixed to said end plate 35, causing the same to turn as a unit. Thus main shaft 26 may revolve unaffected by said prime mover 28. Bearing 39 further supports the front end of the integrated clutch housing 37 and pinion carrier 38.

Forward clutch, generally designated 40, contains drive plates 42 and driven plates 44. Forward clutch 40 circumscribes splined hub 46 I.D. and O.D., which circumscribes main shaft 26, and is capable of transmitting direct drive. Annular piston 48, positioned between forward clutch 40 and rear clutch 50, utilizes pressurized lubrication furnished to said clutches through lines and means to be later elaborated upon. Annular piston 48 rests upon a spacer 52 circumscribing main shaft 26. Rear clutch 50, being the larger of the two clutches and responsible for the operation of the rear portions of the transmission, consists of drive plates 54 and driven plates 56. Rear clutch 50 is separated from forward pinion carrier 38 by means of spacer 58.

Figure 2:
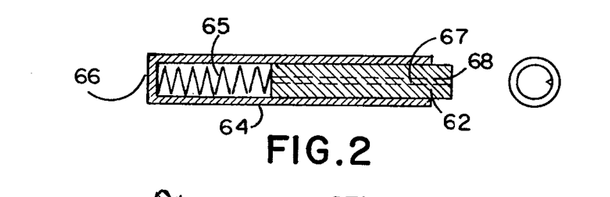
FIG. 2 is an enlarged longitudinal section of a separator used in the clutches of the transmission of FIG. 1.

In conjunction with clutches 40 and 50, reference is now made to FIG. 2 wherein there is illustrated one of the six separators 60 used, their operative ends positioned alternately, to prevent the possibility of a clutch disc slipping into an undercut.

Separator 60 consists of a spring-loaded free fitting plunger 62 which works within a closed end cylinder 64. Spring 65 communicates with closed cylinder end 66 and the interior end of plunger 62. Plunger 62 has a relief groove 67 on its side to allow plunger 62 to act as a balanced piston due to the fluid pressure being the same on each end of plunger 62. Operative plunger end 68 thereby maintains a constant, but light, pressure against the adjacent clutch drive plate. Three plungers are associated with the pressurized oil lines which activate forward clutch 40 and three are associated with oil lines which activate rear clutch 50 and are positioned alternately in annular piston 48.

Positioned and aligned with clutches 40, 50 and housing 37 is the pressurized oil lubrication system or hydraulic servo-system generally designated 70. The phantom lines of FIG. 1 designate the upper portion of the gear driven oil pump 72 and the machined flange faces of oil annulus 73 Submerged gear-type pump 72 is driven by two helical gears 76 and 78. Pump 72 draws oil from a filtration unit means in a sump (not illustrated) and discharges the same into the base of variable pressure regulator 80. Further included in the hydraulic servo-system, but not illustrated at this time, are a rotary distributor valve, a by-pass valve, a differential piston pressure regulator and an accumulator which, in combination, feed pressurized oil to oil annulus 73, fitting 84 and passage 85 of FIG. 1, which, in turn, furnishes pressurized lubrication to all vital locations of transmission 20. Passages 86 and 88 connect, as is illustrated, to annular piston 48 and communicate with its related separators 60 (six in number) in clutch housing 37 to supply oil for the operation of clutches 40 and 50 as directed by the rotary distributor valve.

The gearing arrangement is characterized by two sets of epicyclic gear trains which are interconnected for least reduction by a dual-annulus gear 90. Torque is transmitted rearwardly to load shaft 92 which, at its center, is fixably connected to main shaft 26. The operating interrelations of the gearing elements are to be later discussed, but the spatial relations will be illustrated first.

Forward pinion carrier 38 including pinion shaft 94, is supported and separated from the hub extension of dual annulus 90 by bearing 96. Integrated carrier housing 38 and clutch housing 37, are mounted and separated from rear pinion carrier hub extension 100, which communicates with rear clutch 50, by bearing 98. Carrier 38 and clutch housing 37 are further separated from oil annulus 73 by bearing 99. Dual-annulus gear hub 90 is supported by and separated from rear pinion shaft extension 100 by bearing 101.

Completing the forward gear set is annulus gear 104 which is activated by band brake 106 which is directed by control means associated with the hydraulic servo-system. Gears 108 and 110 complete the forward pinion gear cluster, gear 110 communicating with forward extension of dual annulus 90.

Second band brake 112 controls dual annulus 90 and is also connected with control means of the hydraulic servo-system. A sprag clutch 114 is further situated between dual annulus 90 and rear pinion carrier 120 which, at the appropriate time, allows these two elements to be locked into step. The rear pinion shaft is designated 122. Numeral 126 designates a locator which assures proper placement of pinion shaft 122 during assembly. The rear pinion cluster includes three gears 128, 130, 132 which act in combination to transmit torque to load shaft 92. Rear annulus gear 134, revolving on load shaft 92, and meshing with the middle gear 128 of the cluster, is controlled by rear brake band 136 which is also connected with control means of the hydraulic servo-system. Rear pinion carrier 120 rests upon bearing 124. Load shaft 92 is supported by bearing 138. Reference numeral 140 generally designates the oil seal assembly for load shaft 92.

Figure 3:
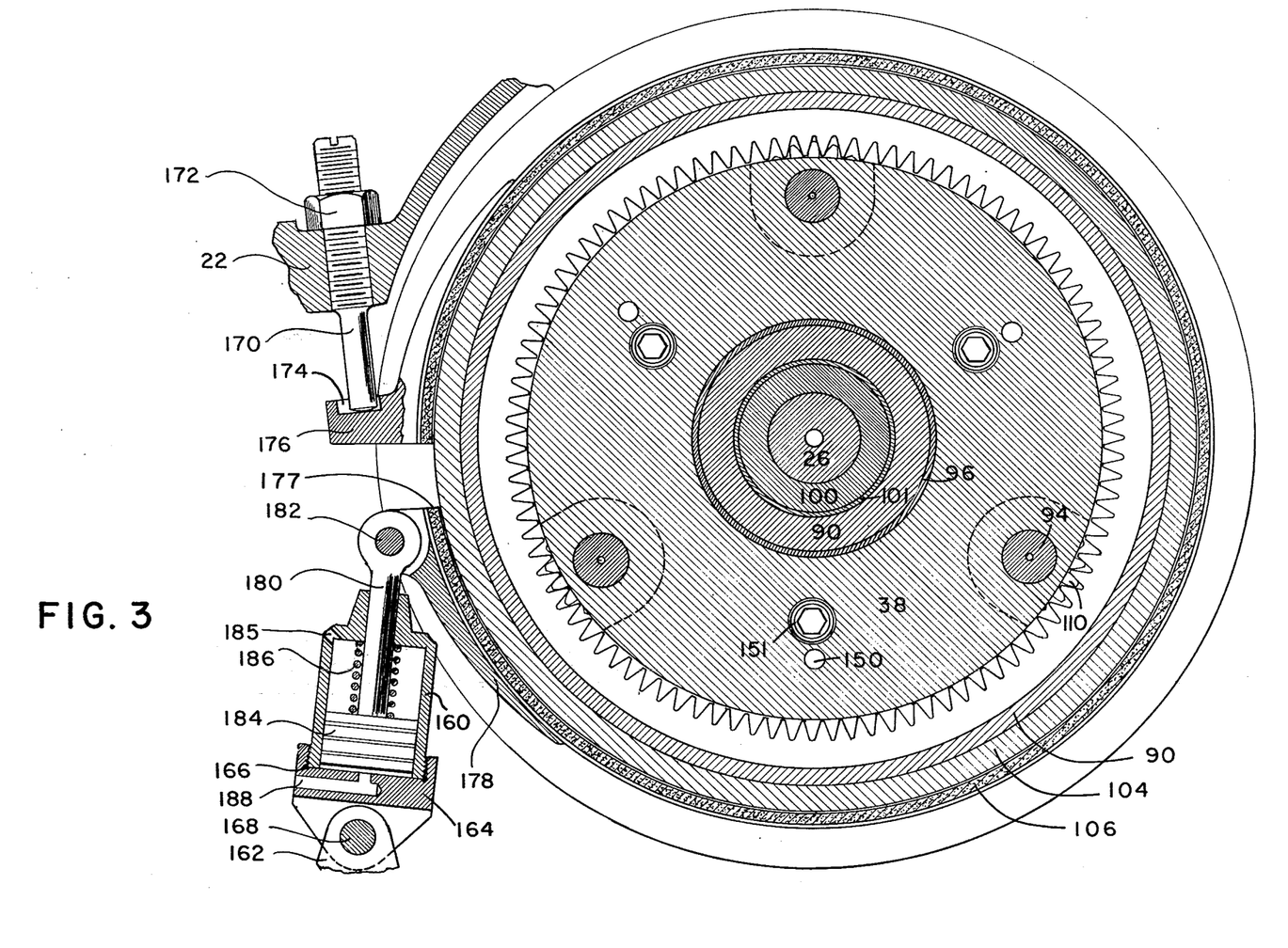
FIG. 3 is a transverse section illustrating the arrangement of a planetary gearing set including driving pinions and a clevis mounted hydraulic band brake of the present invention.

FIG. 3 illustrates the arrangement of driving pinion gear 110 and dual annulus 90 in combination with one of the band brakes 106, and one of the clevis mounted hydraulic cylinders, generally designated 160, used to activate band brakes 106, 112, 136. Three pinion sets are used for both the front and rear planetary units. More pinion sets could be used per section, which could result in size and weight reductions, but the basic driving principle would remain the same. With the gearing selected, the following ratios of engine speed to load shaft may be obtained: Reverse 4.167; first or low 2.631; second 1.584; third 1.295; fourth or direct drive 1:1.

Main shaft 26 is circumscribed by rear pinion carrier hub extension 100. Bearing 101 separates dual annulus 90 from rear pinion carrier hub extension 100. Bearing 96 separates the hub O.D. of dual annulus 90 from forward pinion carrier 38. Dowels 150 assure proper placement during assembly and in combination with capscrews 151 hold carrier 38 and clutch housing 37 in rigid alignment. Forward pinion shaft 94, supported by clutch housing 37, supports die cast gear 108 of the pinion gear cluster. Brake band 106 is wrapped around the hub of annulus gear 104. Brake band 106, as are all bands, is designed, as is common to the art, to not drag on the hub of annulus 104 when the external controls are released. The hub of annulus gear 104 further circumscribes the forward extension of dual annulus 90.

Pinion gear 110 of the cluster, which meshes with dual annulus gear 90 may be constructed from oil hardened and ground steel, its hub projection being used as a base for die cast gear 108. In the rear unit gears 130 and 132 are also die cast gears with pinion gear 128 hub projections serving as the base. Since the transmission uses internal gear drive exclusively and since there are three pinion gear clusters, therefore three pinion gears in each train, there are a minimum of six gear teeth carrying the load in each train at any one time resulting in very low tooth loading. Thus, this aspect makes feasible the use of die cast gears which yield a marked reduction in manufacturing costs.

The clevis mounted hydraulic cylinder, generally designated 160, which operates the brake bands, is mounted on a boss 162 of case 22, with base 164 of cylinder 160 screwed on against seal 166. Pin 168 is retained by a snap ring.

Brake anchor pin 170, having a locking nut 172, is adjustable in a complementary boss of case 22 and holds one end of brake band 106 by engaging notch 174 in upper fitting 176. Movable end 177 of band 106, being an integral part of attached lower clevis fitting 178, is fastened to cylinder piston rod 180 with pin 182 and thereafter suitabley secured. Piston 184, having a housing or casing cylinder 160, with a vent 185, is securely fastened to its driving piston rod 180 so that no movement of either is possible in relation to the other.

Figure 8:
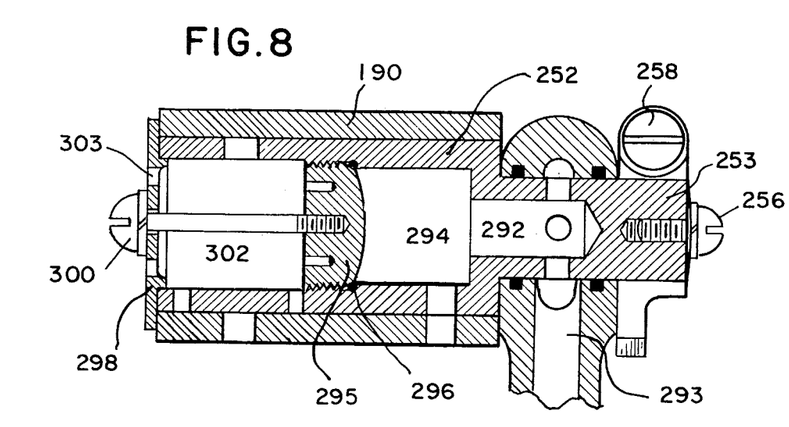
FIG. 8 illustrates the relations of the component parts of the rotary distributor valve of FIGS. 4 and 7.

Strong spring 186 forces fluid lubrication through line 188, which line also supplies pressurized lubrication to force the piston upwards and thereby activate the brake band, to drain the fluid to the rotary distributor valve of FIG. 8 when the pressure against piston 184 is cut off from said distributor valve. Strong spring 186, therefore, acts to compensate and reduce the force of entering high pressure fluid which acts upon the lower end of piston 184. This allows a gradual tightening of brake band 106 upon annulus gear 104 and creates a gradual restraint of annulus gear 104 which, in turn, reduces shock and stress upon internal elements during gearing changes.

Figure 4:
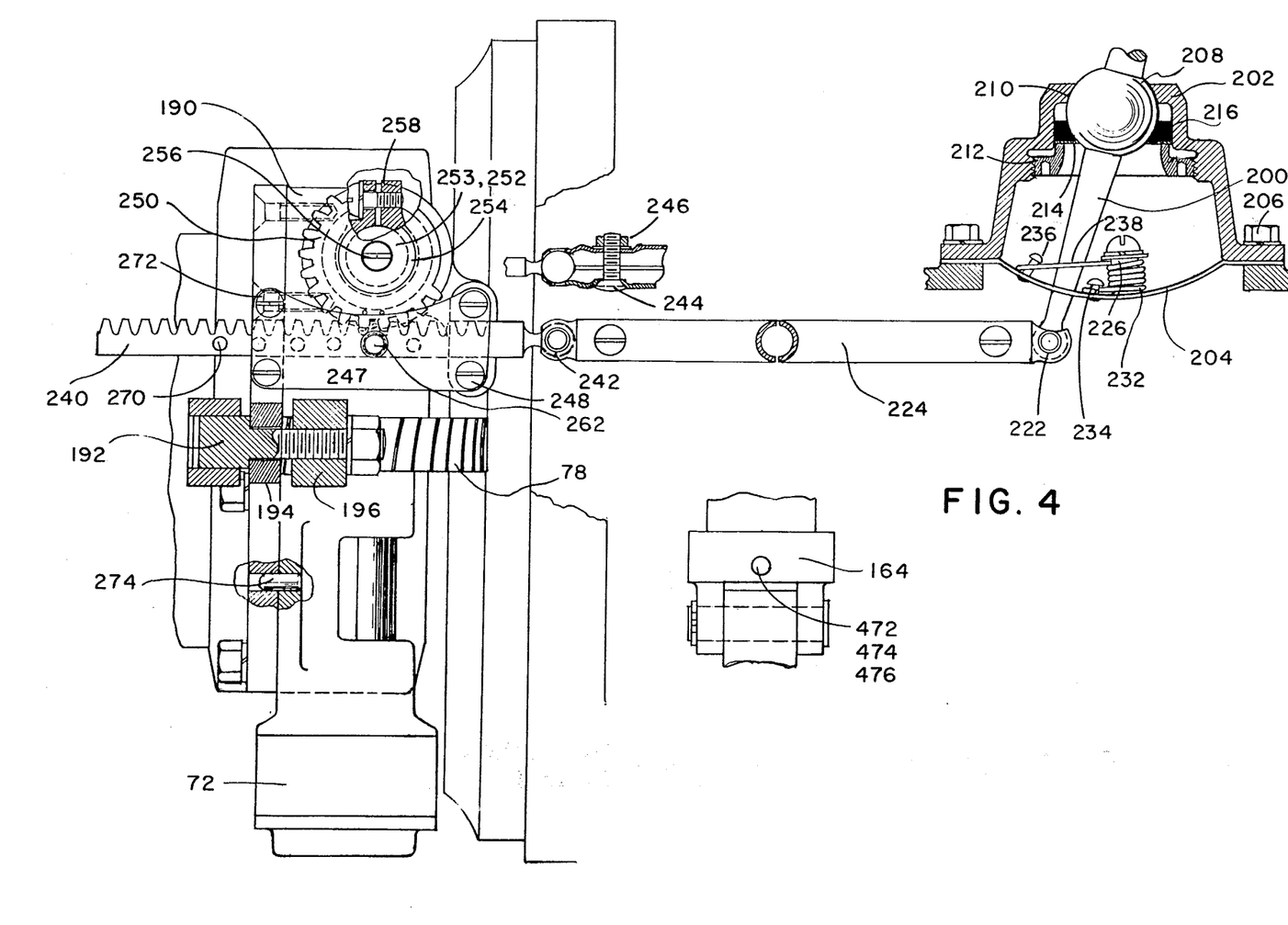
FIG. 4 is a side elevation view taken on FIG. 7 illustrating the operative manual control system including shifting arrangement, rack and pinion driven rotary distributor valve, and a view of adjustment features of the hydraulic pump drive gears of the hydraulic servo-system.

FIG. 4 illustrates a view of the shifting arrangement in combination with an end view of the rack and pinion driven rotary distributor valve 190. Transmission 20 is placed in operation by the action of prime mover 28 causing forward pinion carrier 38 to drive helical gears 76 and 78 of gear type pump 72 which, in turn, activates the hydraulic servo-system. In FIG. 4 only a portion of gear 78 is shown primarily to illustrate the adjustment of the backlash of gear 78. Proper backlash is obtained simply by adjusting screw 192 which is threaded into lug 196 and bears against a machined lug face of mounting flange 194 of oil annulus 73 of FIG. 1 and FIG. 4.

Figure 5:
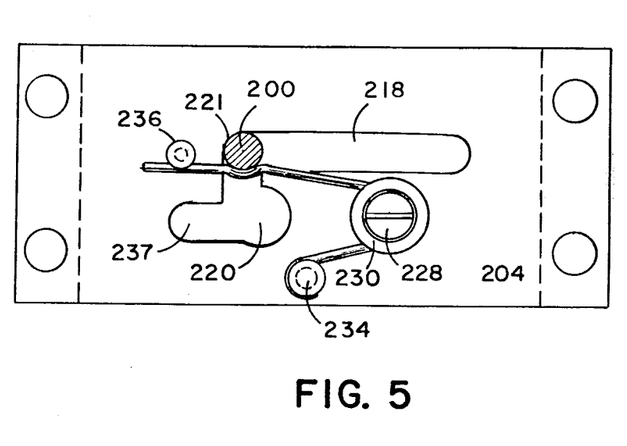
FIG. 5 further illustrates a top view of the shifter plate assembly of the shifting arrangement of FIG. 4.

Referring now to FIG. 4, which illustrates a side view of the manually operated shifting arrangement, and referring to FIG. 5, which illustrates a top view of the shifter plate assembly, shift lever extension 200 is encased in housing 202 and extends downward through shifter plate 204 which is also secured to housing 202 by four capscrews 206. Shifter plate 204 is curved downward in a concave relation to a horizontal plane. Shift lever extension 200, threaded into a ball assembly 208 which is held against a spherical seat 210 in housing 202 by a threaded retainer 212, a flat washer 214, and a neoprene rubber seal 216. Shifter plate 204 (FIG. 5) includes longitudinally cut out portions 218 and 237 which allow movement of shift lever 200 forward and backward to direct the proper gearing arrangements. Shifter plate 204 has provisions, through means of a cut out portion, being aperture 220, in communication with forward end 221 of cut out portion 218, to allow downward ball end 222 which connects to linkage 224, to pass through when assembling and to allow movement to reverse position.

An internally threaded boss 226 is welded to plate 204. An appropriate screw 228 and washer 230 complement serve to locate spring coil 232. Button head rivet 234, positioned adjacent to threaded boss 226, restrains an extending end of spring coil 232, said end being partially looped around said rivet 234. Button head rivet 236 is aligned with said forward portion 221 of said longitudinal cut out portion 218 such that, due to the curvature of plate 204, the spring end extension 238 presses against rivet 236 and presses against lever extension 200 thus locking and restraining lever extension 200 in the desired neutral position, as illustrated due to spring end extension 238 being deformed in a slight curvature where it contacts lever extension 200. Sufficient pressure is maintained to keep lever extension 200 in this position, but not enough to prevent easy manual movement of said lever forward into reverse position as desired. In reverse position, shift lever extension 200 is moved forward in aperture 237 whereby spring tension will maintain lever extension 200 in position due to spring extension pressure forcing lever extension 200 against end of slot in plate 204.

Referring now exclusively to FIG. 4, ball end 222 of lever extension 200 is appropriately secured to linkage 224 which is in turn secured similarly to rack 240 by ball end connection 242. These ball-end connections are secured by a bolt 244 and nut 246 which allows for movement of shift lever extension 200 in a straight line shifting arrangement which, in turn, allows for straight line movement of toothed rack 240.

Toothed rack 240 is meshed with pinion gear 250, operatively connected to rotary distributor valve 190, causing the proper and desired operation of the hydraulic servo-system which directs the operation of the epicyclic gearing to transmit torque to the load shaft. Operating rack 240 maintained in its position by plate 247 fastened to the machined faces of projecting flange of oil annulus 73 and cast arm of valve housing 190 by means of four screws collectively numbered 248.

To assemble this portion of transmission 20 and to set the proper alignment between rack 240 and pinion gear 250 of rotary distributor valve 190, of which only an end view is shown, the following procedure should be followed:

In FIG. 4, pinion gear 250 is positioned upon hub 253 of rotary core 252 of rotary distributor valve 190. Gear 250 is secured to hub 253 by retaining washer 254, hub screw 256, which screw further penetrates into hub 253, and clamping screw 258. Rack 240 is installed simultaneously. Gear 250 has two marked teeth between which a marked tooth or rack 240 is positioned. The teeth are marked simply for assembly to assure proper alignment so that, when in operation, neither element will overrun the other.

Figure 6:
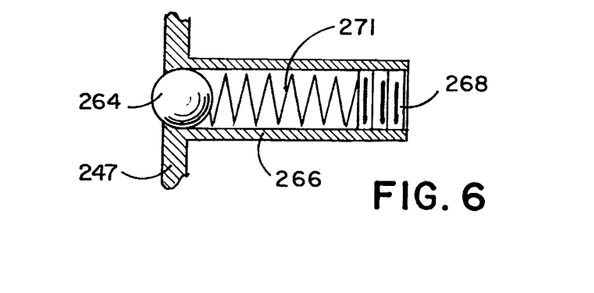
FIG. 6 illustrates an enlarged view of the spring loaded ball and plate detent used to position the operating rack of FIG. 4.

Spring-loaded ball and detente assembly 262 is attached. This assembly is best illustrated in FIG. 6. This assembly simply consists of a steel ball 264 within a cylinder 266 having a closed end 268. Open ball end has a plate 247 which is secured to distributor housing 190 and oil annulus flange 194 by screws (see FIG. 7). Ball 264 is simply forced into sockets 270 in rack 240 by spring to 271. This maintains rack 240 at the proper position for each gear and thus prevents unwanted movement.

To complete the assembly of this portion of transmission 20 and to set the proper alignment between rack 240, pinion gear 250 and rotary distributor valve core 252, the following procedure is advised. Locating pin 272 is inserted through the lowermost high pressure fitting of rotary distributor valve housing 190 and core 252, to be later illustrated, assuring proper alignment of these two elements. Shift level 200 is placed in "reverse" position, that is, in aperture 237 of FIG. 5. This asures that interconnected linkage 224 and rach 240 will be positioned to their maximum forward extent to align said pinion gear 250 and rack 240. Pinion gear 250, thus, will be able to rotate in a counterclockwise direction to allow proper line connections of neutral through fourth gear as shift lever 200, linkage 224 and rack 240 are moved manually rearward. To secure this assembly, clamping screw 258 is tigntened after screw 256 has been tightened into hub 253. Locating pin may thereafter be removed from the fitting so the proper fluid line may be attached. Dowel 274 allows oil pump 72, and its related gear to be rotated slightly to adjust helical gear tooth contact.

Figure 7:
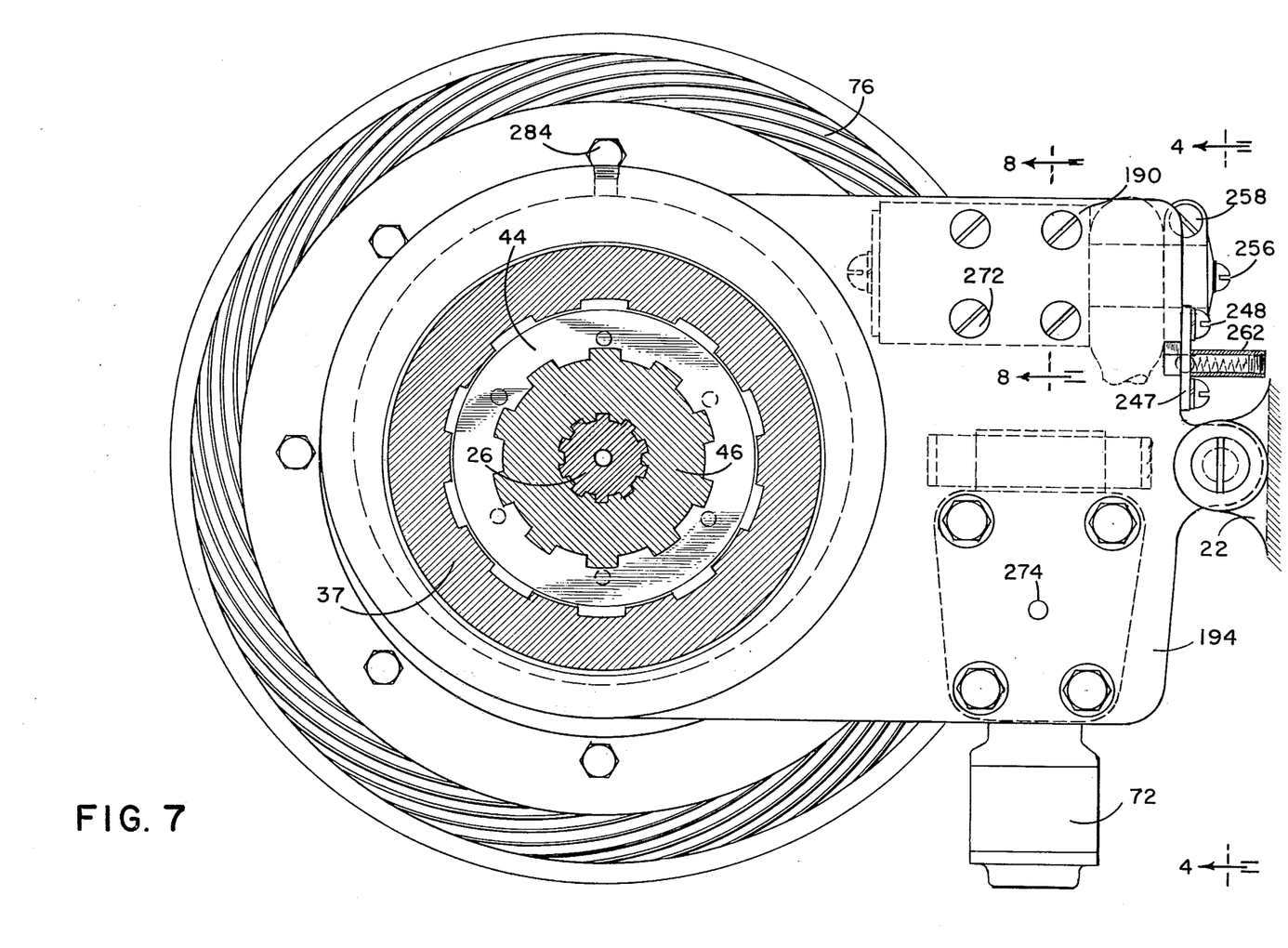
FIG. 7 is an transverse section, of FIG. 1, illustrating the helical gear driving arrangement for the submerged gear type pump in conjunction with components of the hydraulic servo-system of FIGS. 1 and 4.

FIG. 7 illustrates a transverse section of the helical gear driving arrangement for submerged gear type pump 72 taken along line 7—7 of FIG. 1. Also illustrated is the positioning of spring-loaded ball detente 262 of FIG. 6 which acts to maintain the meshed teeth of pinion gear 250 and rack 240 in proper alignment. Plate 247 and screws 248 are also illustrated in relation to rack 240 position. Also illustrated are the mounting means for the attachment of rotary distributor valve 190, which is secured to mounting plate 194 by four screws 272.

Helical gear 76, mounted on a flange of clutch housing 37, and retained by capscrews 284, is driven by the same receiving torque from prime mover 28. Helical gear 78 thereafter provides the driving force for pump 72 (FIG. 1).

FIG. 8 illustrates by a longitudinal section, components of rotary distributor valve 190. Housing 190 encases a core 252 (viewed singularly in FIG. 9) both of which contain lubrication pressure ports and drain ports capable of communicating through rotation of core 252. Hub screw 256 and clamping screw 258 securing pinion gear 250 to hub 253 of core 252, assure that core 252 will rotate with pinion gear 250 as directed from shift lever 200 through the straight line shifting arrangement (FIG. 4). As a result of core 252 rotation, appropriate high pressure core ports and drain ports will communicate with housing ports to activate the appropriate gearing relations for the operation of transmission 20.

Core 252 is cylindrical in shape. Hub 253 is characterized by its solid end around which pinion gear 250 is positioned and by its hollowed portion 292 which communicates with the hollowed portion of cylindrical core 252. Sealed fitting and connection 293, communicating with hollowed hub portion 292, transmits main line lubrication as governed by variable pressure regulator 80 through hub 253 to high pressure core chamber 294. This connection is a free fit but any axial movement is limited by clamping screw 258 on hub 253 of said core 252. Threaded plug 295 with O-ring 296 seals high pressure chamber 294. Ported end plate 298, secured to plug 295 by elongated screw 300, maintains the axial postion of rotary core 252 and provides drainage from drainage chamber 302 through ports 303 as needed. This drained oil is recirculated to a collecting sump in communication with oil pump 72.

Figure 9:
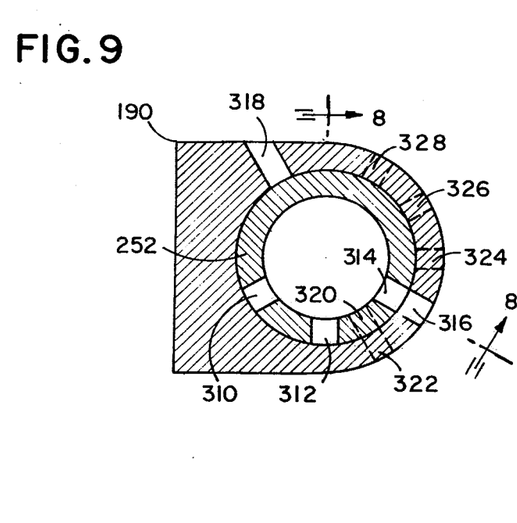
FIG. 9 is a transverse section through the rotary distributor valve of FIG. 8.

FIG. 9 is a transverse view from the end of rotary distributor valve 190 illustrating high pressure chamber 294 of core 252 encased by housing 190. It will be noted that the exterior physical design of housing 190 is that of a horeseshoe or C-shape and parallels the shape of distributor pinion gear 250 and its related toothing arrangement. This embodiment allows easy attachment, as was illustrated in FIG. 7, to mounting plate 194.

Core 252 being cylindric in shape contains three large high pressure ports 310, 312, and 314 which lie in the same vertical plane. These ports provide the means to supply high pressure oil, at the appropriate time, to operate front clutch 40 or rear clutch 50 through two corresponding housing ports 316, 318. To illustrate, therefore, large core port 314 aligned with housing port 316 causes pressurized oil flow to activate rear clutch 50 through line 86 and annular piston 48. Illustrated in dotted outline is one small high pressure core port 320 which aligns with housing port 322, to supply high pressure oil to activate rear brake band 136, to supply housing port 324 to deliver high pressure oil to activate middle brake band 112, and to supply housing ports 326 and 328 to forward brake band 106. It should be noted that housing ports 326 and 328 are a dual feed to the same oil line, that being to forward band 106.

The distinctive features and specific operation of rotary distributor valve 190 will be elaborated upon when considering the total operation of transmission 20. At this point reference is made to Table 1 which illustrates the combinations of core ports and housing port connections occuring and the resultant gear ratios. It is simply important to note that core 252 is directed manually through the operation of gear lever linkage 224, rack 240 and pinion gear 250 which, in combination, cause rotation of core 252 counterclockwise in steps of thirty degrees to the remaining five operative positions.

Figure 10:
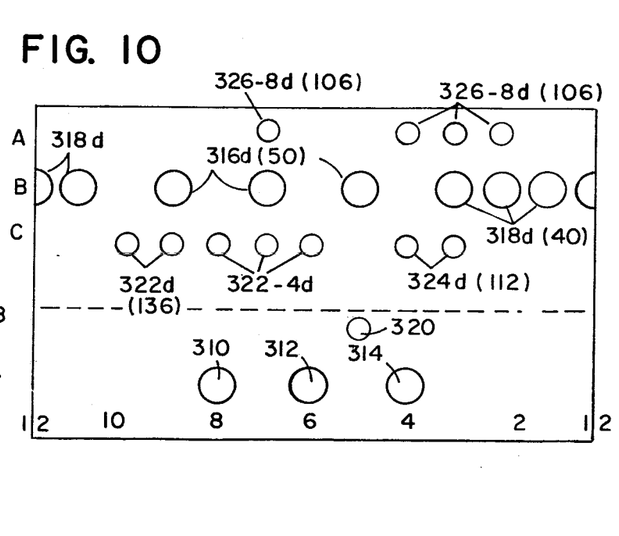
FIG. 10 is a developed view of the outer surface of the spool of the rotary distributor valve of FIGS. 8 and 9.

FIG. 10 is a developed view of the outer surface of core 252 where it contacts housing 190 and should be viewed in conjunction with Table 1 and FIG. 9. The illustration of core 252 of FIG. 9 has been arbitrarily split at twelve o'clock to show the location of drain holes in addition to pressure holes. A mylar sketch of FIG. 11 placed over FIG. 10 will illustrate the various connections caused by the rotation of core 252 within housing 190, by moving the sketch in a right to left motion.

Figure 11:
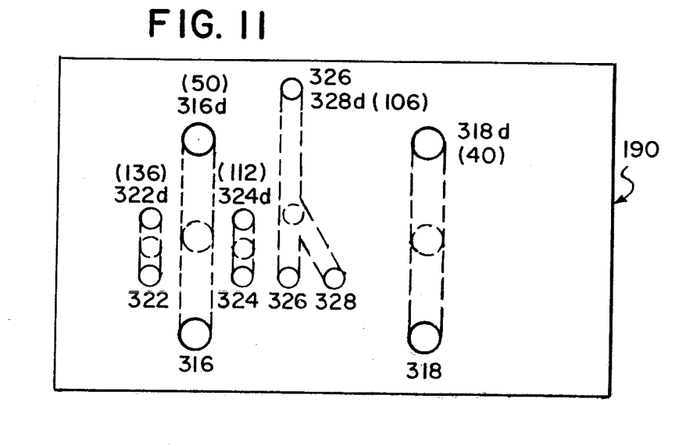
FIG. 11 is a developed view, taken along lines 8—8 of FIG. 8, of the inside of the rotary distributor valve housing of FIG. 8 illustrating feed and drain ports and a phantom view of related hose connections.

FIG. 11 illustrates a view from the inside of the housing 190 of FIG. 9 showing the location of pressure holes 316, 318, and 322–328, the drain holes marked with a corresponding small d, and a phantom view of the hose connections on the O.D. of housing 190. The same hose or line connections supply or drain operative elements. It should be noted in combination with the previous figures that, unless a clutch element or power cylinder is supposed to be under pressure, it is connected to drain, thus precluding the possibility of any accidental or unwanted drag, that is, if a pressure port of core 252 is not supplying oil to a corresponding housing port line, clutch or power cylinder, a corresponding drain hole of core 252 communicates with housing port ports to drain that element. Thus it will be observed that drain holes in the row A drain forward brake band 106; row B drains the oil supplied to activate forward clutch 40 and rear clutch 50; row C drain holes drain the oil supplied to the rear and middle brake bands 136 and 112. The drain holes are further numbered by R, N, 1, 2, 3 and 4 to further illustrate when they are open and connected with housing port drain holes numbered 316d, 318d, 322d–328d when transmission 20 is in operation. It should also be noted that in neutral all components are in the drain position and no high pressure ports are in communication.

Figure 12:
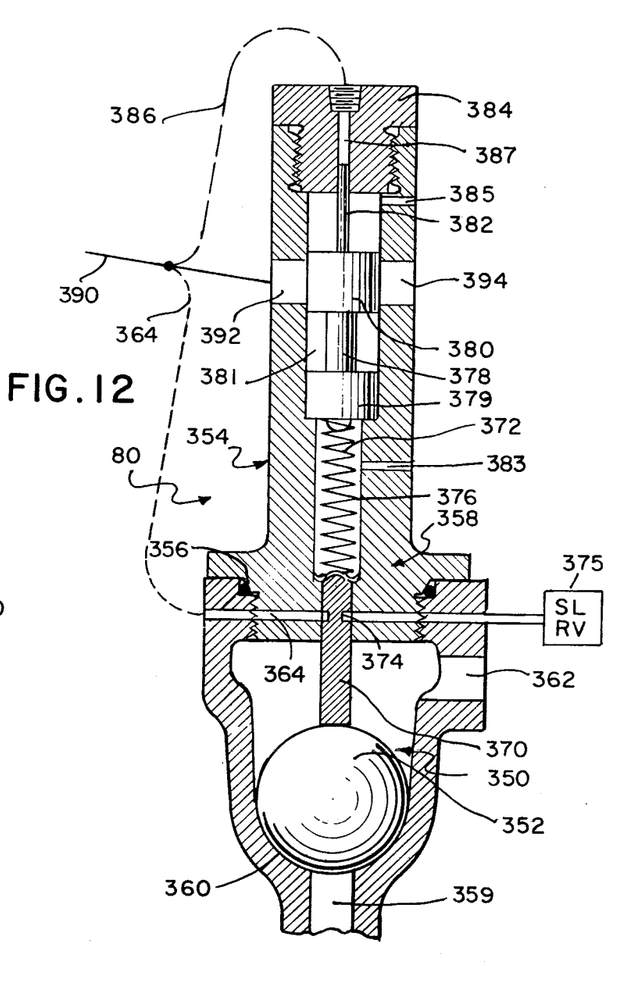
FIG. 12 is a longitudinal section, of the variable pressure regulator.

FIG. 12 illustrates a longitudinal section of variable pressure regulator 80, within the hydraulic servo-system, which initiates the ability of transmission 20 to pick up the load gradually, without shock, as with hydraulic coupling. Variable pressure regulator 80 may be divided into two major components including a lower hollowed chamber 350 which contains a ball 352. This portion is sensitive to oil flow discharge rates from pump 72. The upper section is a spring-loaded and actuated regulator valve 354, sensitive to variable fluid pressure, which directs pressure to rotary distributor valve fitting 293. Valve body 354 is screwed, as a threaded connector, against O-ring seal 356 thus sealing ball chamber 350 and forming an appropriate integrated housing 358. Fitting 359 at the base of and leading to chamber 350 receives oil from helical gear driven pump of FIG. 7. Chamber 350 is characterized by a spherical seat 360 upon which ball 352 may rest. The diameter of seat 360, at A—A of FIG. 13, in housing 358 is calculated to allow five percent of the maximum pump discharge to flow around ball 352 without appreciably changing the indicated position of ball 352 which, in effect, corresponds to a slow idle of the engine. As may be seen from the enlarged section, FIG. 13, the inner surface of chamber 350 is symmetrical about a vertical center line, the projection of any horizontal section being a true circle. The surface from Sec. A—A to Sec. B—B may be considered as the frustum of an inverted right circular cone, with its base at Sec. B—B. The diameter of the chamber at Sec. B—B is calculated to allow ten percent of the maximum pump discharge to flow around the ball 352, with its center at this position. This position corresponds to a "fast idle" of the engine. The chamber I.D., from Sec. B—B to Sec. C—C, is uniform so only a minimal increase in engine speed will move ball 352 to Sec. C—C. The chamber, above Sec. C—C, has a pronounced outward taper which allows maximum pump discharge, without restriction, through port 362.

The threaded connection between chamber 350 and regulator valve 354 is further characterized by an oil line 364 through the housing threaded connection. Plunger 370 has one end in communication with the upper surface of ball 352, its other end extending through the housing 358 past oil line 364 to be in communication with spring 372 of spring-loaded regulator valve 354. When ball 352 is positioned at rest in spherical seat 360, plunger annular groove 374 acts to connect the two distinct portions of housing line 364. Line 364 extends to a spring-loaded relief valve 375 which limits pressure within line 364. Spring chamber 376 is defined at its lower extent by plunger 370 and at its upper extent by spool 378 and a mediately positioned vent 379. At an idling speed, ball 352 is at rest. With incremental increases in engine speed and pump oil flow, the compensating fluid pressure versus spring compression concepts of the present invention are placed into practice in the initiation of the hydraulic servo-system.

Spool 378, its two cylinderical components and connecting portion being treated as a unit, has end 379 and end 380. Spool chamber 381 is of a larger diameter than spring chamber portion 376. Spool endface 379 therefore rests upon the upper extent of spring chamber 376. In communication with spool endface 380 is an upper plunger 382 which extends into a bore through threaded connecting cap 384. Immediately below cap 384 is spool chamber vent 385. Upper plunger 382 further communicates with oil line 386 supported and guided through reamed hole 387 in cap 384 said line connecting to main oil line 390 at the juncture of plunger line 364. At rest, spool end 380 acts to obstruct main line ports 392 and 394. The movement of ball 352 upwards causes the activation of spring-loaded regulator valve 354.

At an idle speed, the pressure in pipe 390 to rotary distributor valve 190 is somewhat less than that dictated by spring-loaded relief valve 375 through plunger line 364. As pump volume pressure increases slightly, ball 352 forces plunger 370 upwards one-eighth inch and disconnects plunger line 364 from spring-loaded relief valve 375. Spring 372, being compressed incrementally against endface of spool 378, allows some main line pressure to pass from port 394 to port 392 to the juncture of lines 364, 390 and 386. This increase then acts through line 386, which is secured within threaded connector 384, against the small endface of upper plunger 382 which, as previously stated, is supported and guided by reamed hole 387. This action pushes spool 378 downward and closes port 390 until another increase in pressure of spring 372 occurs through the upward movement of ball 352.

Figure 13:
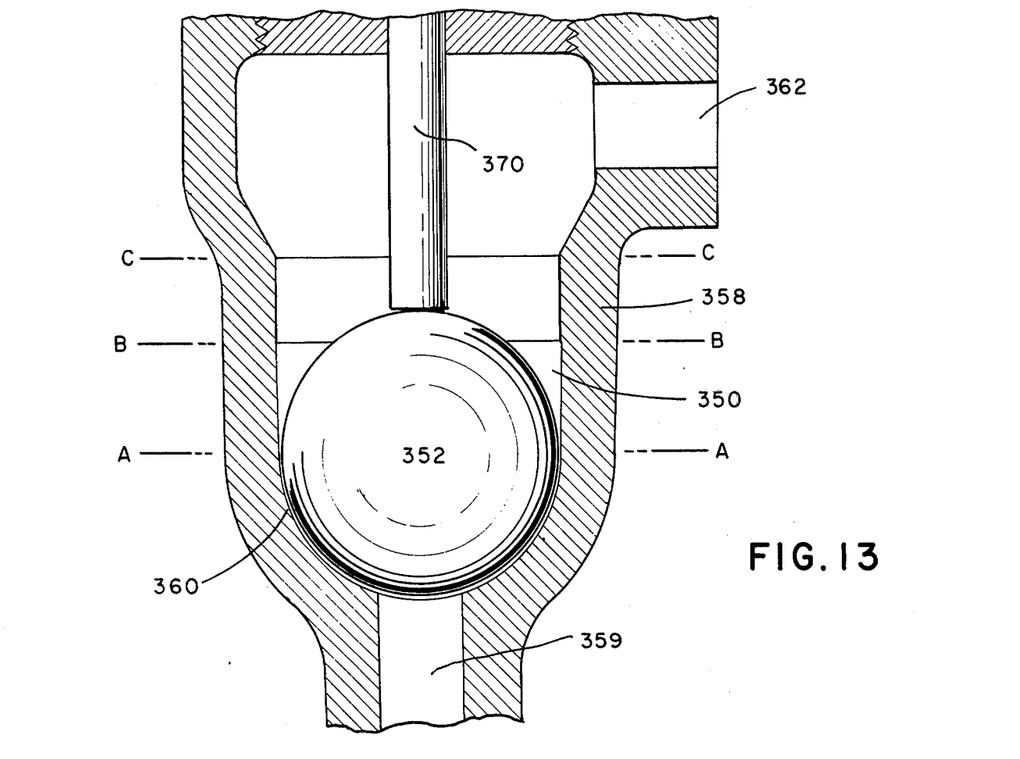
FIG. 13 is an enlarged view of the hollowed chamber of the variable pressure regulator of FIG. 12.

Therefore, at an idline speed, ball 352 allows a pump discharge of five percent of maximum flow without moving appreciably from its seated positon. As pump flow increases, ball 352 moves upward in flow meter fashion, to plane B—B (FIG. 13). This position corresponds to a fast idle of the engine. Spring 372 has a calculated compressive strength such that, at a fast idle, the weights of plunger 382 and spool 378 plus the force of fluid pressure upon plunger 382 will form an equilibrium with said spring compression, and all elements will move as a unit. All this time, line 390 pressure to distributor valve 190 has been increasing gradually. Since line 390, which in turn directs pressurized lubrication to the gearing elements, is increasing, the resultant pressure upon the activation means of the gearing elements will be increasing gradually. Furthermore, especially due to the compensating pressure design of brake band control means, earlier described, the interaction of the gearing elements will increase gradually. Thus, this combination hydraulic servo-system allows for gradual initiation of the gearing elements and prohibits quick engagement of the gearing elements, which would produce shock. At a fast idle transmission 20 is in gear on a solid basis.

This cycle is repeated until the pressure of spring 372, at the half-inch upward position, i.e. center of ball 352 at plane B of FIG. 13, becomes equal to line pressure 390 against upper plunger 382 through line 386. At this point, due to the uniform chamber bore from plane B—B to plane C—C of FIG. 13, a minimal increase in engine speed, causes all elements to move as a unit, and spool 378 fully opens port 392 to rotary distributor valve 190 through line 390. Variable pressure regulator 80 remains in this position until engine speed returns to idle.

Figure 14:
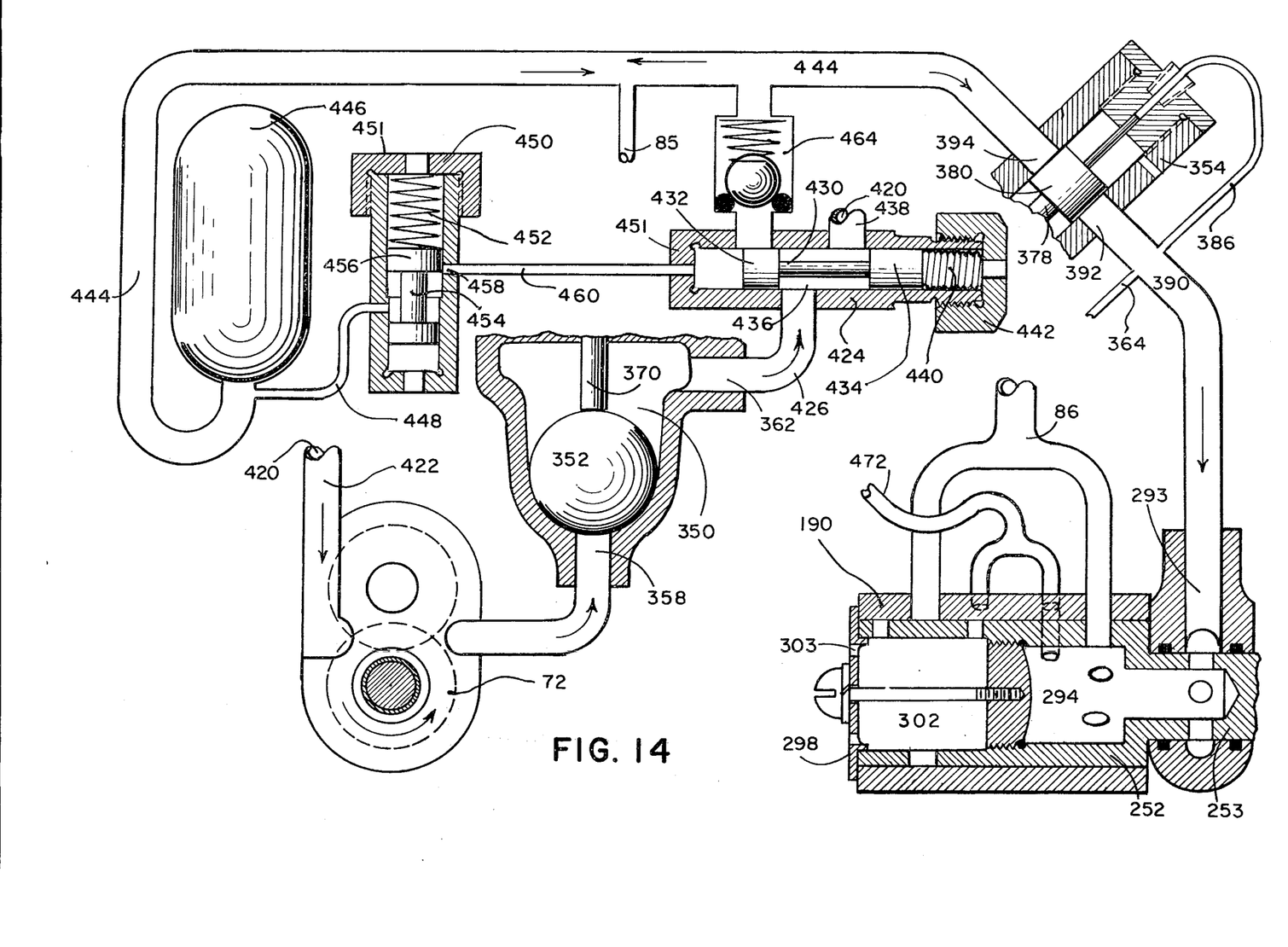
FIG. 14 is a flow pattern for the hydraulic servo-system of the transmission of FIG. 1 illustrating the relationship of the various components of FIGS. 4, 7, 8, 9 and 12.

Referring now to FIG. 14, the flow pattern, relation and operation of the essential elements of the hydraulic servo-system are illustrated, and in this instance, it will be assumed that transmission 20 is in reverse.

The view of the distributor valve is that of Section 8—8, of FIG. 9, except that it is looking in the opposite direction to the arrows to show the high pressure ports. FIG. 14 further illustrates the means to maintain oil pressure at desired operating levels so that, again, gear changes will be accomplished without shock due to said maintenance of adequate pressure.

Submerged gear-type pump 72 draws oil from some form of filtration unit in sump 420 through pipe 422. This oil is discharged to fitting 359 at the base of variable pressure regulator chamber 350 and is acted upon as described above in conjunction with FIGS. 12 and 13.

For the purposes of this figure we will assume that the engine speed, or that of variable prime mover 28, is in the operating range, that is a speed above fast idle. Thus ball 352 will be in the upper portion of chamber 350, above plane C, due to the oil flow into fitting 359, thus causing spool 378 to fully open port 392 to rotary distributor valve 190. Also as previously stated, the oil flow to distributor valve 190 causes the operation of the proper gearing relations, to be later discussed, due to the manual operation of shift lever 200.

The oil forced into chamber 350 passes through port 362 to by-pass valve body 424 through line 426 from whence it is redirected to sump 420. By-pass valve body 424 is comprised of a housing containing a spool 430 around which this oil flow passes. Spool ends 432 and 434 encase this flow area 436 which allows line 426 and line 438, to sump 420 to be positioned adjacent horizontally opposing each other. By-pass valve 424 further encases a spring 440 which is securely held in place against endface of spool 434 and by a threaded connecting nut 442, which is vented to sump 420.

Port 394 on spring-loaded regulator valve 354 opposite port 392 connects to main line 444 and an accumulator 446. High pressure line 448 connects at the juncture of accumulator 446 and main line 444 to, in turn, lead to differential piston pressure regulator 450 encased in a housing having a threaded vented cap 451, said piston having a spring 452 and a spool 454. Differential piston 454 and by-pass valve 424 both act upon a principle of compensating fluid versus spring compression pressures. Differential piston 454 is sensitive to main line 444 and accumulator 446 pressure whereby spring 452 has a compression relative to this pressure as hereinafter described. When main line and accumulator pressure is sufficient, oil pressure from line 448 acts upon differential piston 454 and spring 452, and causes spool end 456 to partially uncover port 458 leading to line 460, said pressure compressing spring 440 of by-pass valve 424. Thus by-pass valve 424 recirculates pump oil flow to sump 420.

When main line 444 and accumulator 446 combined pressures, acting against differential piston i.e., spool 454, drops to the point where the pressure of spring 452 against endface 456 of spool 454 is sufficient to uncover port 458 to line 460, then by-pass spring 440, which has been fully compressed until now, quickly pushes spool 430 to the extreme left position exhausting the oil in line 460 through adjustable vented cap 451. Spool end 434 closes port outlet to sump 420 and forces gear pump 74 to discharge through spring-loaded ball check 464 to accumulator 446 through main line 444. As accumulator 446 pressure builds, spool 454 of differential piston regulator 450 rises against the action of spring 452 until port 458 to pipe 460 is again uncovered. High pressure oil, acting against endface 432 of by-pass spool 430 then fully compresses spring 440 and again recirculates pump oil flow to sump 420 until main pressure again falls and the cycle is repeated.

At this point all clutch and brake band connections have been made. While spring 440 is extended and oil is flowing through spring loaded ball check 464 to line 444 to fill accumulator 446, oil flowing to port 394 is directed past variable pressure regulator spool 378 to port 392 to juncture of lines 364, 386, and 390 and to rotary distributor valve 190, the operation of which has been previously described. Pressure from main line 444 is applied to furnish pressure lubrication to all vital points and locations through line 85 at fitting 84 on oil annulus 73. As a result of this combination, therefore, at speeds above fast idle, main line pressure is maintained to alleviate shock during gearing changes, and due to the interrelations of gearing changes to be hereinafter described, it will become evident that torque will be transmitted smoothly.

With rotary distributor valve core 252 in the position shown by all previous figures, with the exception of FIG. 4, oil pressure is applied to passage 86 through rotary distributor valve core port 314 and housing port 316. This oil is then delivered to annuluar piston 48, and its related separators 60 of FIG. 1, to actuate rear clutch 50 causing torque to be transmitted from drive plates 54 to driven plates 56. This causes rear pinion carrier hub extension 100 and rear pinion carrier 120 to turn at engine speed or that of prime mover 28 as illustrated by FIG. 1. Simultaneously, pressure is applied through rotary distributor ports 320 and 322 and line 472 to actuate the power cylinder which tightens brake band 136 and restrains annulus gear 134. Pinion gear 128 of the rear pinion cluster is caused thereby to give reactive force to another member of the cluster, gear 132, which turns load shaft 92 in the opposite direction to that of rear pinion carrier 120. The transmission is now in reverse but only on a creeping basis at an idle speed. The engine must be up to fast idle before full pressure is available for clutch and/or power cylinder operation.

In neutral, no pressure is applied to any of the elements due to the 30° rotation of distributor valve core 252 so there is no tendency for load shaft 92 to rotate in either direction. All connections are draining.

In low or first gear the same clutch and pinion carrier action takes place, as in reverse, that is, port 312 of rotary distributor valve core 252 connects with housing port 316 to passage 86 due to manual shifting action which has caused core 252 again to rotate 30°. Ports 320 and 324 are thus connected and thereafter supply oil pressure to line 474 which causes middle brake band 112 to restrain dual annulus 90. Gear 132 thus drives load shaft 92 forward but at a greatly reduced rate as compared to that of pinion carrier 120.

In second gear, manual straight line shifting again causes rotary distributor valve core 252 to rotate another increment of 30°. Core port 320 aligns with housing port 326 and line 476 which tightens forward brake band 106 on the hub of annulus gear 104, restraining the same, which in turn causes forward pinion cluster gears 108 and 110 to drive dual annulus gear 90 forward, but at a reduced rate to that of prime mover 28. While dual annulus gear 90, which in first gear was motionless, is being increased in speed corresponding to the pinion ratios, rear pinion carrier 120 is slowing down, all the while giving up inertial energy to the load shaft 92. Since no clutch discs are engaged, there would normally be a tendency for rear pinion carrier 120 to slow to zero and then reverse its rotation with relation to dual-annulus gear 90. This action is prevented by sprag clutch 114 which will not allow rear pinion carrier 120 to turn counterclockwise with respect to the hub of dual-annulus gear 90, when viewed from the prime mover end of the transmission. Therefore, with the rear pinion carrier 120 locked in step with dual-annulus gear 90, the torque passes directly through the entire assembly including the rear cluster, thereby adding another increment of speed to load shaft 92, the reduction being that of the forward pinion cluster since all elements turn as a unit.

In third gear, core 252 is further rotated 30° aligning ports 320 and 328. As previously mentioned, fitting 328 is part of a dual feed to line 476 and forward brake band 106. Core port 310 is also aligned with housing port 316 which directs oil to annular piston 48 and activates rear clutch 50 and its related separators 60. This causes rear pinion carrier 120 to release its locked position and to rotate at the speed of the engine or prime mover 28 thus adding another increment of speed to load shaft 92.

In fourth gear, core 290 is further rotated, aligning ports 314 and 318 to direct oil to annular piston 48 and its related separators 60, and thereby actuating forward clutch 40. This provides a direct connection between prime mover 28 and main shaft 26 which is integrated with load shaft 92 yielding direct drive.

As previously noted, pinion gears 110, 128 could be made of oil hardened and ground steel with the hub projections used as a base for die cast gears 108, 130 and 132. Since transmission 20 uses internal gear drive, exclusively, and since there are three pinion gears in each train there are a minimum of six gear teeth carrying the load in each train. This fact makes feasible the use of die cast gears which should effect a marked reduction in manufacturing costs.

The foregoing has described a manually directed step-gear transmission characterized by an integrated compensating fluid pressure versus spring compression hydraulic servo-system. It should be noted that the hydraulic servo-system could be incorporated into many transmissions now in existence. Such a system, therefore, undoubtedly is subject to variation, thus, the inventor does not wish to be strictly limited to specific components, as evidenced by the specification, due to variations which could be made without departing from the spirit of the invention as evidenced by the following claims.

I claim:
1. In hydraulic actuated epicyclically geared power transmissions having an engine input shaft and output load shaft, annulus gears with power cylinder and band control means and pinion gear clusters the combination comprising:
   a forward transmission section dual clutch unit and integrated forward pinion carrier and related gear clusters receiving driving power from said engine shaft;
   a main transmission shaft integrated with said load shaft and in communication with said dual clutch unit;
   a rearward transmission section pinion carrier including a shaft projection in communication with said dual clutch unit and having pinion gear cluster means in communication with said load shaft and annulus gear supported on said load shaft;
   a dual clutch unit capable of transmitting torque through said rear pinion carrier and said rear cluster to drive said load shaft;
   said rear pinion cluster capable of transferring torque from said rear pinion carrier and giving reactive force to said load shaft resulting in a reverse gear ratio and capable of transferring torque to cause said load shaft to turn the same direction of said rear pionion carrier but at a reduced speed relative to the speed of said engine shaft;
   a dual annulus gear in communication with said forward gear cluster and with said rear cluster to transmit torque from the forward transmission section to the rear section;
   means in communication with said rear carrier to lock said dual annulus and rear carrier in step causing rotation as a unit at a reduced speed relative to the speed of said engine shaft, the reduction being in proportion to the ratio of said forward pinion cluster gears resulting in a second gear ratio;
   said dual clutch being capable of transmitting torque to said rear pinion carrier to unlock said forward and rear sections resulting in a third gear ratio which is a higher ratio than said second gear ratio; and
   said dual clutch unit capable of transmitting torque through said main shaft to said load shaft resulting in direct drive.
2. The transmission of claim 1 wherein each pinion carrier has at least two pinion gear clusters per carrier operatively mounted upon a pinion shaft.
3. The power transmission of claim 2 wherein said rear pinion transmission section further includes:
   an annulus gear revolving on said load shaft
   a rearward pinion gear meshing with said load shaft
   a middle pinion gear meshing with said annulus gear;
   a forward pinion gear in communication with said dual annulus;
   said rear cluster so arranged such that when said annulus is restrained, reactive force is transferred through said rear pinion gear as driven by said rear carrier to drive said load shaft, causing said shaft to rotate in a reverse direction to that of said rear pinion carrier, said rear pinion carrier being rotated by activation of said dual clutch unit, providing a reverse drive; and
   said rear cluster so arranged to have the capability such that when said dual annulus gear is restrained said rear pinion gear is capable of transmitting low speed torque causing said load shaft to rotate in the same direction as said rear pinion carrier driven by said dual clutch, but at a reduced speed relative to the speed of said engine shaft, providing a low gear ratio.

4. The power transmission pinion gear clusters of claim 3 wherein said rearward and forward pinion gears of the rear set are of die cast construction and said middle pinion gear is of oil hardened and ground steel construction using internal gear drive exclusively.

5. The power transmission of claim 2 wherein said forward pinion transmission section further includes:
   a rearward pinion gear meshing with said dual annulus;
   a forward pinion gear meshing with a forward annulus gear;
   said pinion gears of said forward transmission section so arranged such that when said forward annulus is restrained, said rearward gear, driven by said forward pinion, drives said dual annulus in the same direction as said engine-driven carrier whereby said locking means, being a sprag clutch, causes said load shaft and rear section to rotate as a unit at a speed proportional to the gear ratio of said forward pinion set resulting in a second forward speed; and
   said dual clutch unit capable of driving said rear carrier and unlocking said sprag clutch when said forward annulus is restrained to add a further increment of speed to said load shaft through the combination of the rotation of said front and rear sections, resulting in a third forward speed.

6. The power transmission pinion gear clusters of claim 5 wherein said forward pinion gear is of die cast construction and said rearward pinion gear is of oil hardened and ground steel construction creating internal gear drive exclusively.

* * * * *